United States Patent Office 2,942,940
Patented June 28, 1960

2,942,940

PROCESS FOR EXTRACTING TUNGSTEN VALUES

Robert C. Osthoff, Schenectady, N.Y., assignor to General Electric Company, a corporation of New York No Drawing. Filed May 22, 1956, Ser. No. 586,375

11 Claims. (Cl. 23—18)

This invention relates to the extraction of tungsten values from tungsten compositions, such as tungsten ores. More particularly, this invention relates to a method of extracting tungsten values from its ores, for example, scheelite, which method comprises treating an aqueous ore-oxalic acid mixture with ammonia. Still more particularly, this invention relates to a process of extracting tungsten values from a tungsten composition which process comprises: (1) treating an aqueous mixture of said tungsten composition and oxalic acid with ammonia, (2) separating the ammonium paratungstate solution so formed, and (3) decomposing ammonium paratungstate to tungstic acid.

Scheelite is a calcium tungstate ore having the properties disclosed in "Tungsten" by Li and Wang, page 9 (Reinhold, 1955). The impurities in any specific scheelite ore will depend on the source of the ore.

Previous methods of extracting tungstic acid from tungsten ores may be divided into two general classes: acidic and basic methods. The most common specific methods now employed commercially comprise extraction with hydrochloric acid or alkali metal hydroxides or carbonates under high pressure. The hydrochloric acid method is disadvantageous because it requires expensive acid-resistant equipment. Furthermore, in the hydrochloric acid method, complete extraction is difficult because a film of tungstic acid forms over the ore which impedes the penetration of the acid into the interior of the ore to effect complete extraction. The use of alkali under high pressure is disadvantageous because it involves the use of an expensive autoclave and because it forms soluble silicates which contaminate the product.

In an attempt to avoid these disadvantages, other methods have been employed. One of these methods is disclosed in Japanese Patent 172,961, granted June 22, 1946, wherein is described the extraction of scheelite with oxalic acid wherein the oxalic acid extracted solution is separated from the ore and tungstic acid recovered therefrom.

In a Japanese Patent application, Number 7,112 of 1952, published January 20, 1954, there is described a process which comprises: (1) the use of the oxalic acid extraction described above, (2) the separation of the extracted solution from the ore, and (3) followed by precipitating tungstic acid by means of ammonia. Thus, in the Japanese processes the oxalic acid-extracted solution is separated from the ore prior to the ammonia treatment.

Although the Japanese patent and patent application claim that tungstic acid may be satisfactorily extracted, their processes require long extractive periods, such as 12 to 48 hours or longer.

Unexpectedly, I have now discovered that tungstic acid can be extracted from the ores in high yields by a process which comprises treating an aqueous ore-oxalic acid mixture with ammonia. In this process both oxalic acid and ammonia are added in the presence of the ore. By using this technique, extraction can be completed in an hour or less. The significance of this process is that tungstic acid can be extracted by a rapid process which is attractive to commercial production.

In general, the process is carried out by taking a tungsten composition such as an ore, natural or synthetic scheelite, and treating it with an aqueous solution of oxalic acid. At this point, some insoluble yellow tungstic acid is observed indicating the following equilibrium:

(1) $CaWO_4 + H_2C_2O_4 \cdot 2H_2O$
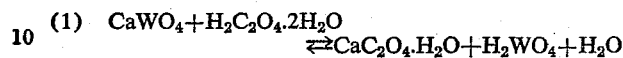
$\rightleftarrows CaC_2O_4 \cdot H_2O + H_2WO_4 + H_2O$ The reaction mixture is then digested at 50–100° C. for a short period of time, for example, 15–30 minutes or longer. At the end of this digestion period, ammonia is added. All traces of tungstic acid disappear at this point, causing a white precipitate to form which contains ammonium salts. The reaction may be expressed as follows:

(2) $2xNH_4OH + yH_2WO_4 + zH_2O$
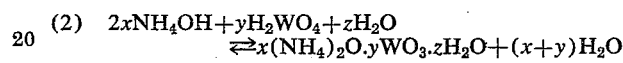
$\rightleftarrows x(NH_4)_2O \cdot yWO_3 \cdot zH_2O + (x+y)H_2O$ Equation 2 has been written in general terms since the constitution of ammonium paratungstate has not been unequivocably established. After an additional digestion period, for example 15–30 minutes or longer, the ammonium salts go into solution. The reaction mixture is then filtered hot and the residual ore washed with hot ammonium oxalate solution which has been made basic with ammonia. Tungstic acid is then precipitated by adding to the filtrate hot hydrochloric acid containing a small amount of nitric acid. By using this oxalic acid-ammonia process in the presence of the ore, tungsten values can be extracted in 97–98% yields from tungsten ore in a purity as high as 99.5%.

In contrast, when the same ore was treated with oxalic acid alone (without the use of ammonia but for the same period of time, i.e. 15–30 minutes) at 40–50° C. or even at 100° C., little, if any, tungsten extraction was observed.

In carrying out the process it is desirable to use as finely divided an ore as is available, taking into consideration the economics involved. I have advantageously employed ore of 100–300 mesh. In carrying out the process, at least one mole of oxalic acid and 5 moles of ammonium hydroxide per mole of convertible tungstic acid are employed for complete reaction. However, an excess is desirable since it tends to shift the equilibrium in the desired direction. Thus, I can advantageously employ from 1 to 15 moles or more of oxalic acid, preferably 3 to 4 moles, and 5 to 30 moles or more of ammonia preferably 5 to 10 moles based on moles of convertible tungstic acid in the sample.

In carrying out the extraction one should use a temperature of 50° C. to 100° C. or higher, but preferably 60° C. to 80° C. Although the extraction can be satisfactorily carried out at atmospheric pressure, the use of super- or sub-atmospheric pressure is not precluded. Digestions with oxalic acid of from 5 to 60 minutes or longer, preferably 15 to 45 minutes are satisfactory. After ammonia is added, a digestion period of 10 to 60 minutes or longer, preferably 20 to 30 minutes used. In carrying out the filtration, it is advantageous to filter the solution hot to be assured that no ammonium paratungstate precipitates out. However, the temperature of filtration can be varied by one skilled in the art based on the amount of water in the solution and the solubilities of ammonium paratungstate which are known to the art. After the ammonium paratungstate solution is obtained, this compound can be converted to tungstic acid by any of the methods known to the art, for example, the methods disclosed in Li and Wang's "Tungsten," pp. 189–192 (Reinhold Publishing Co., 1955).

In order that those skilled in the art may better understand how the present invention may be practiced, the following examples are given by way of illustration and not by way of limitation. All parts are by weight unless otherwise stated. In carrying out the examples, calcium tungstate (i.e. synthetic scheelite of about 300 mesh) having the following analysis was employed: 63.0% tungsten, theoretical for $CaWO_4$, 63.9%. This tungstate corresponds to purity 98.7% $CaWO_3$. All other reagents employed were C.P. chemicals.

In carrying out the following examples, about 1000 parts of calcium tungstate were added to 30 liters of water heated to about 90° C. Then, approximately 2000 parts of oxalic acid dihydrate were added to the beaker. At this point, some insoluble yellow tungstic acid was observed. The reaction mixture was then digested at 100° C. for 30 minutes. At the end of this digestion period about 15 liters of concentrated ammonium hydroxide (28% ammonia based on total weight) was added. All traces of tungstic acid disappeared at this point, leaving a white suspension. After a 30–40 minute digestion, the white precipitate went into solution and the reaction mixture was filtered hot with suction. The precipitate was washed three times with hot ammonium oxalic solution which had been made basic with ammonium hydroxide. Tungstic acid was then precipitated from the filtrate by adding thereto about 53 liters of hot concentrated hydrochloric acid (containing at least 35% HCl based on total weight) containing about 5% by volume of concentrated nitric acid. The total tungsten content was then determined by the usual cinchonine precipitation technique described in Kolthoff and Sandell "Textbook of Quantitative Inorganic Analysis," pp. 728 etc. (Macmillan Co., N.Y., 1947). The results are given in Table I.

TABLE I

*Extraction of tungsten from calcium tungstate with the aqueous ore-oxalic acid-ammonia method*

| Example | 1 | 2 | 3 | 4 |
|---|---|---|---|---|
| Wt. of Sample........parts.. | 1,024.0 | 1,010.1 | 1,015.3 | 1,003.2 |
| $WO_3$ Content.........do.... | 813.5 | 802.5 | 806.6 | 797.0 |
| Wt. $WO_3$ Recovered..do.... | 794.4 | 785.8 | 788.9 | 773.9 |
| Percent Recovered [a] | 97.7 | 97.9 | 97.8 | 97.1 |

[a] Spectroscopic examination of the residue indicated the presence of less than 0.1% tungsten.

The purity of the tungsten oxide which was recovered was 99.5% as determined by tungsten analysis. (For $WO_3$—Calcd.: W, 79.30%. Found: W, 78.9%.)

In order to compare our work with the work disclosed in the Japanese patent and patent application described above, the following examples were carried out.

EXAMPLE 5

Calcium tungstate was treated in the manner of the first four examples up to the point of ammonia addition. Analysis revealed that substantially little, if any, tungstic acid was extracted indicating that extraction with oxalic acid alone for the same period of time is extremely slow.

EXAMPLE 6

This example illustrates the extraction carried out according to the above Japanese processes where ammonia is not added in the presence of the ore.

Calcium tungstate (12.4 parts, $WO_3$ content 10 parts), was treated with 10 parts of oxalic acid dihydrate and 200 parts of water for 22 hours at 40–50° C. At the end of this time 4.5 parts (45%) of the tungstic oxide was extracted.

This example shows that a sort of oxalate-tungsten complex is formed which is soluble and may be filtered. This complex may then be destroyed in strong acid and the tungsten recovered as tungsten oxide. However, in contrast to the extraction of the calcium tungstate ore-oxalic acid mixture with ammonia according to this invention which results in a rapid and almost quantitative conversion of the tungstate to a soluble compound, the processes disclosed in the Japanese patents require long periods of time to extract tungsten from the ore.

In carrying out the process of this invention, it will be evident to one skilled in the art that various modifications can be used. For example, in place of adding oxalic acid and ammonia separately, the ore can be extracted with an ammonium oxalate solution or a solution of another soluble oxalate salt and followed by the addition of ammonia. The tungsten oxide produced can be converted to tungsten by hydrogen reduction or by any of the methods known to the art (cf. Li and Wang, "Tungsten," pp. 195–269). The tungsten so produced can be used in the preparation of wires, rods, and sheets in electric lamp filaments, powder metallurgy, etc.

What I claim as new and desire to secure by Letters Patent of the United States is:

1. A process of extracting tungsten values from a tungsten composition which process comprises treating an aqueous mixture of said tungsten composition and oxalic acid with ammonia and thereafter reacting the tungsten composition with the reaction product of oxalic acid and ammonia.

2. The process of claim 1 wherein the tungsten composition comprises a scheelite ore.

3. The process of claim 1 wherein the tungsten composition comprises calcium tungstate.

4. A process of extracting tungsten values from a tungsten composition which process comprises: (1) treating an aqueous mixture of said tungsten composition and oxalic acid with ammonia and thereafter reacting the tungsten composition with the reaction product of oxalic acid and ammonia, (2) separating the ammonium paratungstate solution so formed, and (3) decomposing the ammonium paratungstate to tungstic acid.

5. The process of claim 4 wherein the tungsten composition comprises a scheelite ore.

6. The process of claim 4 wherein the tungsten composition comprises calcium tungstate.

7. The process of extracting tungsten values from a tungsten composition which comprises (1) treating the tungsten composition with an aqueous solution containing oxalate ions and ammonium ions dissolved therein, (2) separating the ammonium paratungstate solutions so formed, and (3) decomposing the ammonium paratungstate to tungstic acid.

8. The process step of claim 7 wherein the tungsten composition comprises a scheelite ore.

9. The process step of claim 7 wherein the tungsten composition comprises calcium tungstate.

10. In the process of extracting tungsten values as soluble ammonium tungstate from a tungsten composition, the step which comprises treating scheelite ore with an aqueous solution containing oxalate ions and ammonium ions, said oxalate ions being derived from a compound selected from the group consisting of oxalic acid and ammonium oxalate, and said ammonium ions being derived from a compound selected from the group consisting of ammonia and ammonium oxalate.

11. In the process of extracting tungsten values as soluble ammonium tungstate from a tungsten composition, the step which comprises treating calcium tungstate with an aqueous solution containing oxalate ions and ammonium ions, said oxalate ions being derived from a compound selected from the group consisting of oxalic acid and ammonium oxalate, and said ammonium ions being derived from a compound selected from the group consisting of ammonia and ammonium oxalate.

References Cited in the file of this patent

UNITED STATES PATENTS

| | | |
|---|---|---|
| 2,600,655 | Jacobs et al. | June 17, 1952 |
| 2,802,718 | Zotos | Aug. 13, 1957 |

OTHER REFERENCES

Okage et al.: Chem. Abstracts, vol. 46, pp. 2247g, 1952.

Smithells: "Tungsten," 3rd edition, pp. 36, Chapman and Hall Ltd., London, 1952.

Hopkins: "Chemistry of the Rarer Elements," D. C. Heath and Co., New York, 1923, pages 263 to 292 (pages 267, 268, 287 relied on).